June 24, 1969    A. G. STIMSON    3,452,347
LUMINOUS DIODE BATTERY CONDITION INDICATOR FOR CAMERA
Filed Nov. 3, 1966

ALLEN G. STIMSON
INVENTOR.

BY Daniel E. Sragow
Robert W. Hampton
ATTORNEYS

United States Patent Office 3,452,347
Patented June 24, 1969

3,452,347
LUMINOUS DIODE BATTERY CONDITION INDICATOR FOR CAMERA
Allen Gwyn Stimson, Rochester, N.Y., assignor to Eastman Kodak Company, Rochester, N.Y., a corporation of New Jersey
Filed Nov. 3, 1966, Ser. No. 591,913
Int. Cl. G08b *21/00*
U.S. Cl. 340—249    1 Claim

ABSTRACT OF THE DISCLOSURE

A device for determining the battery condition of a motor-driven motion picture camera in which a solid state luminous diode is positioned in the viewfinder of the camera so that the operator is immediately aware if the battery voltage has fallen below a satisfactory operating level.

---

This invention relates to an apparatus for indicating voltage level, and more particularly to an apparatus for indicating the voltage level in a motion picture camera.

In order for the motor of a battery powdered camera to operate at the proper speed, the full load voltage of the battery must be above a certain level. If the full load battery voltage falls below this level, the speed of the motor will decrease, resulting in overexposed movies which appear to move too quickly when projected.

In the prior art, it has been proposed to connect a meter across the battery through a switch, so that when the operator wants to know the condition of the battery, it is necessary to operate the switch. This arrangement has the disadvantage that the operator has to remember to check the battery, since he has no other warning to low battery voltage.

It is, therefore, an object of the invention to give the camera operator warning when the battery is too discharged to run the camera at the required speed.

It is a further object of the invention to provide a simple "yes-no" indication of the full load voltage of the camera battery.

Figure 1:
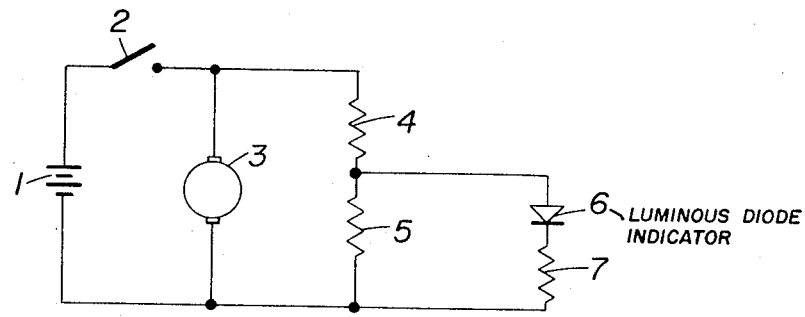
Figure 2:
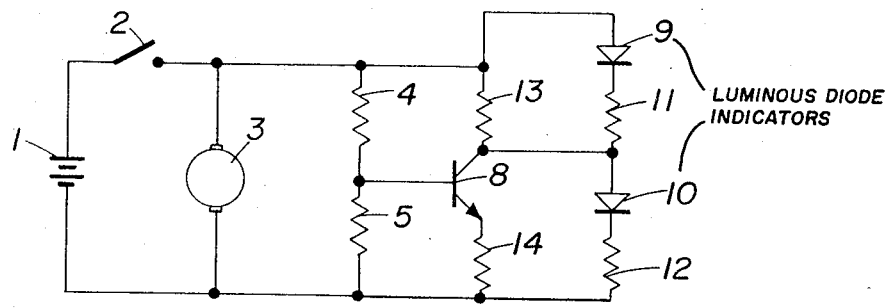
Figure 3:
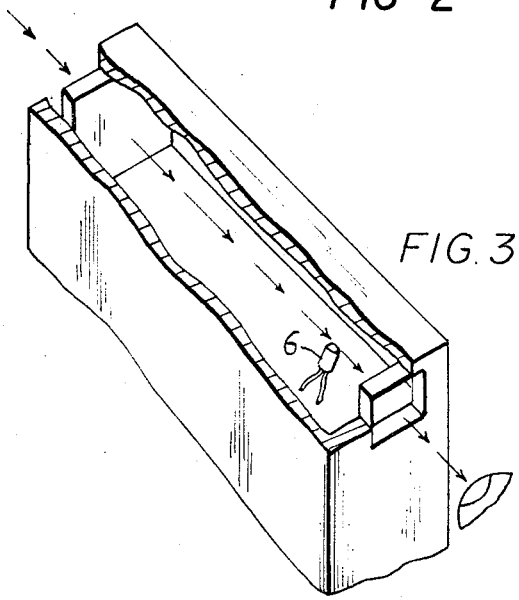

Other objects and advantages of the invention will appear from the following specification in connection with the appended drawings in which:

FIG. 1 is a schematic diagram of a system in which an indicator glows when the voltage is above a certain value, and FIG. 2 is a schematic diagram of a system in which one indicator glows when the voltage is above a certain value, and another indicitor glows when the voltage is below this value, and FIG. 3 is a schematic perspective view of a camera viewfinder having a luminous indicator situated therein.

Briefly described, the present invention provides an arrangement wherein at least one light emitting diode is connected to a voltage source to indicate whether the voltage is above or below a certain value. If the voltage source is set to operate a switch which has a resistor in series, a light emitting diode connected across the switch will glow when the switch is off, and a light emitting diode connected across the resistor will glow when the switch is on. Of course, the switch is preferably an electronic device such as a transistor.

Referring now to the drawings in detail, where corresponding parts have been identified with the same number, FIG. 1 shows a battery 1 connected through a switch 2 to a motor 3 and a resistor network consisting of resistors 4 and 5. When the motor is energized by switch 2, the battery voltage is developed across the resistor network. The portion of the battery voltage which is developed across resistor 5 is applied to the series combination of light-emitting diode 6 and resistor 7. The values of resistors 4 and 5 have been selected so that when the voltage across resistor 5 is above the minimum value at which the motor will operate satisfactorily, light emitting diode 6 will be illuminated. When the voltage across resistor 5 drops below this predetermined value, light-emitting diode 6 will be dark. Resistor 7 has been incorporated to limit the current through light-emitting diode 6.

If this system is employed in a motion picture camera, where the motor 3 drives the mechanism, and where light-emitting diode 6 is placed where it will be visible to the camera operator during operation, as shown in FIGURE 3, the camera operator can immediately see whether the battery voltage is sufficient by the illumination of the light-emitting diode. If the light-emitting diode is not illumnated, then the camera operator knows that the battery charge is too low for satisfactory operation.

FIG. 2 shows an embodiment in which two light-emitting diodes are used. One indicates when the voltage is above a predetermined value and the other indicates when the voltage is below this predetermined value. As in FIG. 1, switch 2 controls the current both to the motor and to the voltage indicating circuit. The voltage of the battery is applied across recistors 4 and 5. The junction of resistors 4 and 5 is connected to the base of transistor 8. The collector-emitter path of transistor 8 is connected across the full-load battery voltage through resistors 13 and 14. Also connected across this voltage are light-emitting diodes 9 and 10 together with their resistors 11 and 12. During operation, providing the full-load voltage is above the predetermined value, transistor 8 is biased to a conducting state. This lowers the potential across diode 10 and resistor 12, which turns off light-emitting diode 10. Most of the battery voltage is therefore across resistor 13 and thus diode 9 will be illuminated. Diode 9 is therefore the indicator that the voltage is adequate. When the voltage falls below the predetermined value, transistor 8 is turned off. Since the impedance of resistor 11 is much higher than the impedance of resistor 13, and since the impedance of the conducting light-emitting diode is very low, when transistor 8 is off, resistor 13 tends to short circuit the series combination of light-emitting diode 9 and resistor 11. This places the major part of the voltage across light-emitting diode 10 and resistor 12. Light-emitting diode 10 therefore is illuminated and light-emitting diode 9 is dark.

If it is desired, light-emitting diode 9 can be made to glow with a green color and light-emitting diode 10 can be made to glow with a red color. In this manner, when a diode is glowing green there is adequate battery voltage, but when a diode is glowing red, there is inadequate battery voltage. It is to be understood with regard to this embodiment that if it is desired only to indicate low battery voltage, diode 9 with its associated resistor 11 could be omitted.

It is again pointed out that if the described voltage indicating device were to be used in a motion picture camera, the light-emitting diode or diodes could be placed in the operator's field of view, so that he would immediately be apprised if the battery voltage were insufficient.

This invention has been described in detail with particular reference to preferred embodiments thereof, but it will be understood that variations and modifications can be effected within the spirit and scope of the invention as described hereinabove and as defined in the appended claims.

I claim:
1. In a motion picture camera having an electrically driven motor and a battery for furnishing power to said motor, and further having a viewfinder through which a scene may be viewed by a camera operator, a battery voltage indicator comprising: a voltage divider network, first and second solid state luminous diodes positioned within said viewfinder and coupled to said motor through said voltage divider network and means for lighting said first diode when the voltage is above a predetermined value and for lighting said second diode when the voltage is below said value.

References Cited

UNITED STATES PATENTS

| | | | |
|---|---|---|---|
| 2,644,134 | 6/1953 | Schnoll | 324—122 XR |
| 2,942,189 | 6/1960 | Shea et al. | 324—133 |
| 3,061,781 | 10/1962 | Diemer | 324—133 XR |
| 3,076,901 | 2/1963 | Rubin et al. | 324—133 XR |
| 3,157,870 | 11/1964 | Marino et al. | 340—249 |
| 3,304,430 | 2/1967 | Biard et al. | 250—211 XR |
| 3,321,754 | 5/1967 | Grimm et al. | 340—249 |
| 3,366,819 | 1/1968 | Crowder et al. | 250—217 XR |
| 3,230,420 | 1/1966 | Kapteyn | 324—29.5 XR |
| 3,232,193 | 2/1966 | Stimson | 324—115 XR |

FOREIGN PATENTS 983,307    2/1965    Great Britain.

RUDOLPH V. ROLINEC, *Primary Examiner.*

G. R. STRECKER, *Assistant Examiner.*

U.S. Cl. X.R.

352—141; 95—10; 324—133